Jan. 6, 1931.  L. S. WILBUR  1,787,560
SPLICE BAR OR FISH PLATE
Filed July 20, 1929  2 Sheets-Sheet 1

Inventor:
Lawrence S. Wilbur
By Arthur F. Durand
Atty.

Jan. 6, 1931.  L. S. WILBUR  1,787,560
SPLICE BAR OR FISH PLATE
Filed July 20, 1929  2 Sheets-Sheet 2
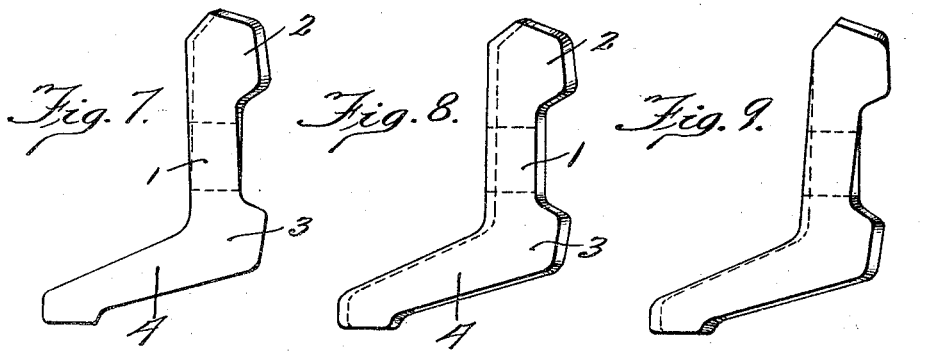
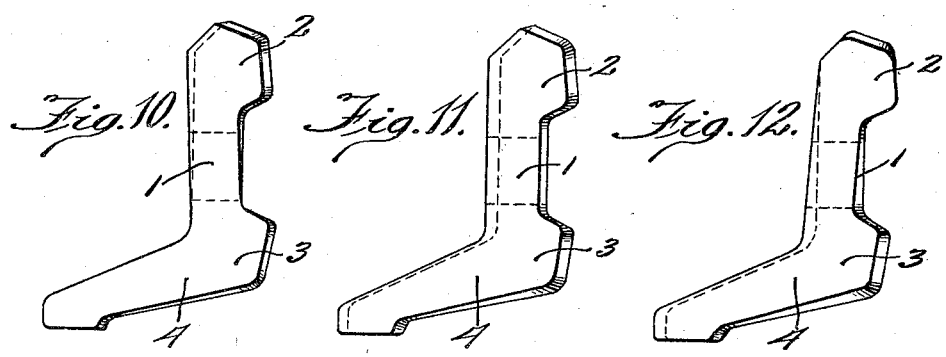
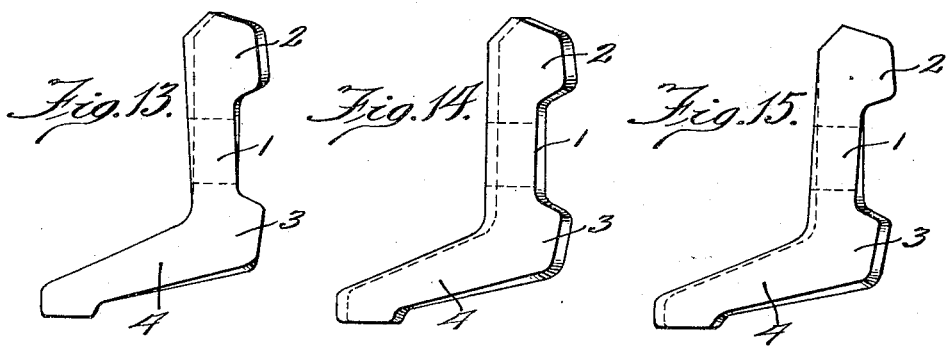
Inventor:
Lawrence S. Wilbur
By Arthur F. Durand
Atty.

Patented Jan. 6, 1931

1,787,560

UNITED STATES PATENT OFFICE

LAWRENCE S. WILBUR, OF EVANSTON, ILLINOIS

SPLICE BAR OR FISHPLATE

Application filed July 20, 1929. Serial No. 379,648.

This invention relates to splice bars or fish plates for use on rail joints. It relates more particularly to splice bars or fish plates adapted to be used on old rails which have become worn and distorted by use.

Generally stated, the object of the invention is to provide a splice bar or fish plate comprising two straight end portions which are disposed at an angle to each other, forming an obtuse angle on the inner side of the bar or plate where the two straight portions meet, such straight portions being either the top or bottom portions of the bar or plate, or both, and the said bar or plate being humped or crowned on either the top or bottom thereof, or on both the top and bottom, whereby to adapt the bar or plate for proper engagement with old and worn or distorted rails.

It is also an object to provide certain details and features of construction and method steps tending to increase the general efficiency and the desirability of a splice bar or fish plate of this particular character.

To the foregoing and other useful ends, the invention consists in the matters hereinafter set forth and claimed, and shown in the accompanying drawings, in which—

Fig. 7 is an end view of the bar or plate shown in Fig. 1, and Figs. 8 and 9 are similar views, showing different forms of the invention.

Fig. 10 is an end view of the bar or plate shown in Fig. 2, and Figs. 11 and 12 are similar views, showing different forms of the invention.

Fig. 13 is an end view of the bar or plate shown in Fig. 3 of the drawings, and Figs. 14 and 15 are similar views, showing different forms of the invention.

Figure 4:
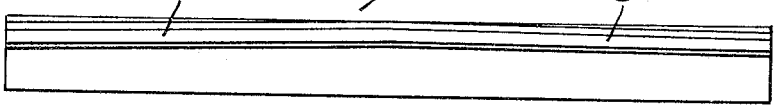
Fig. 4 is a plan view of the bars shown in Figs. 7, 10 and 13 of the drawings.
Figure 5:
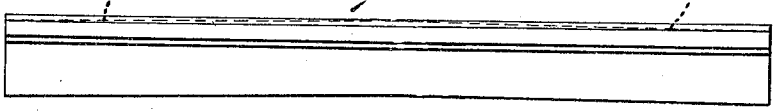
Fig. 5 is a plan view of the bars shown in Figs 9, 12 and 15 of the drawings.
Figure 6:
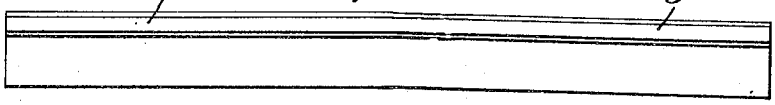
Fig. 6 is a plan view of the bars shown in Figs. 8, 11 and 14 of the drawings.

As thus illustrated, the splice bars shown in Figs. 1, 7, 8 and 9 are humped or crowned on their upper sides only, whereby the bar is of greater fishing height at the middle than at the ends thereof. As indicated in Fig. 7, the bar comprises an upright web portion 1 and a top or head portion 2 and a heel portion 3 forming the foot of the bar or plate. The bottom flange 4 is integral with the said heel portion and extends downwardly and outwardly, as shown. The top or head portion is bent or so formed that the ends thereof extend away from the sides of the rails, thus forming two straight end portions, such as the end portions 5 in Fig. 4, which extend at an angle to each other to form an obtuse angle on the inner side of the middle of the bar. The bottom of the bar or plate, however, as shown in Figs. 4 and 7, is perfectly straight from one end of the bar to the other. As shown in Figs. 6 and 8, the bar is formed throughout its height in such a manner that the bar comprises two straight end portions 6 that extend away from the rails at the ends of the bar, and that form an obtuse angle where they meet at the middle of the bar, on the inside of the latter. In Fig. 9 of the drawings, only the bottom portion of the bar is bent or formed to provide straight end portions 7 and 7, disposed at an angle to each other, forming an obtuse angle on the inside of the bar, as indicated in Fig. 5 of the drawings.

In Figs. 2, 13, 14 and 15 the bar is crowned or humped at its bottom only, the top being straight or level throughout the length thereof, but here again the bar or plate is of greater fishing height at its middle than at the ends thereof. In Fig. 13 only the top or head portion of the bar is bent to form two straight end portions forming an obtuse angle where they meet at the inside of the bar, as indicated in Fig. 4 of the drawings; and in Fig. 14 of the drawings the entire bar is bent to form straight end portions, as shown in Fig. 6 of the drawings; while in Fig. 15 of the drawings only the bottom portion of the bar is bent to form straight end portions disposed at an angle to each other, as indicated in Fig. 5 of the drawings.

Figure 1:
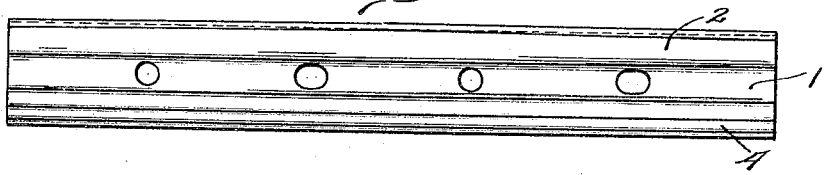
Fig. 1 is a side elevation of a splice bar or fish plate embodying the principles of the invention.
Figure 2:
Fig. 2 is a similar view, showing a different form of the invention.
Figure 3:
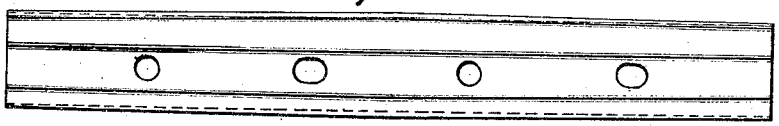
Fig. 3 is a similar view, showing a different form of the invention.

In Fig. 3 of the drawings, the bar or plate is humped or crowned on both the top and bottom thereof, as indicated in Figs. 10, 11 and 12 of the drawings. In Fig. 10 of the drawings, the bar or plate is bent only at its top or head to provide straight end portions disposed at an angle to each other, forming an obtuse angle where they meet at the middle of the bar; and in Fig. 11 the entire bar, from top to bottom thereof, is bent to provide straight end portions disposed at an angle to each other, forming an obtuse angle where they meet at the middle of the bar, on the inside thereof; and in Fig. 12 of the drawings only the bottom portion of the bar is bent or formed to provide straight end portions disposed at an angle to each other and forming an obtuse angle where they meet at the middle of the bar, on the inside of the latter. A plan view of the bar shown in Fig. 10 would be as shown in Fig. 4 of the drawings; and a plan view of the bar shown in Fig. 11 would be as shown in Fig. 6 of the drawings; and a plan view of the bar shown in Fig. 12 would be as shown in Fig. 5 of the drawings.

Therefore, in each form of the invention, there are two straight end portions, for the bar or fish plate, which end portions may be either the top only or the bottom only of the bar or plate, or which may be both; but in any event the bar is of greater fishing height at the middle thereof than at the ends of the bar or plate. In other words, the straight end portions disposed at an angle to each other may comprise only the top or head portions of the bar or plate, or may comprise only the bottom portions of the bar or plate, or may comprise the entire end portions of the bar or plate, from top to bottom thereof.

Bars of this kind are especially adapted for use on old rails that have become worn or distorted by use, or by the pounding of the car wheels, and by the creeping action of the rails. Such wear and distortion ordinarily increase the fishing height on the sides of the rail, at the meeting ends thereof, at opposite sides of the rail joint, and hence the desirability of having the bars of greater fishing height at the center thereof, or at the middle, than at the ends of the bar or plate. In addition, each bar or plate, as shown, has an obtuse angle on its inner side, at its middle, and this also serves to take care of the increased fishing height on the sides of the rails, especially at the middle of the joint, whereby each bar will have proper engagement at both top and bottom, throughout the length thereof, with the sides of the rails, when the bars are secured to the sides of the rails by the usual bolts.

The bars shown and described can be either new bars or old bars reformed and reshaped in the desired manner. Preferably, the bars shown and described are old bars reshaped or reformed, as it is more economical to produce the bars this way than by producing them from new stock. If desired, in the reshaping or reforming of old bars, the entire bar can be increased in height, somewhat, as by reducing the thickness of the web or bar 1 of the plate, thus further adapting the bars or plates for use on rails which have become worn to the extent the fishing height on the sides of the rails has been increased throughout the length of the splice bars.

It is obvious that the different forms of the invention shown and described could be used in combination with each other, in one and the same unitary structure. For example, two different forms of the invention can be used on opposite sides of the same rail joint; also, the different forms of the invention can be used on successive joints in the same general rail structure, bars of one form being used on one rail joint, bars of another form being used on another rail joint, and the different bars being thus combined in one and the same unitary structure, the form of bar being used here or there depending upon the worn or distorted condition of the rails, some rails accommodating one form of bar or another, to advantage, and some a different form; but the different bars cooperating with each other to maintain the continuity of the rails.

What I claim as my invention is:

1. A splice bar or fish plate for rail joints, comprising straight end portions disposed at an angle to each other, forming an obtuse angle on the inside of the bar or plate, said bar or plate being of greater fishing height at its middle than at the ends.

2. A structure as specified in claim 1, said straight end portions comprising the top or head portion only of the bar.

3. A structure as specified in claim 1, said straight end portions comprising the bottom only of the bar.

4. A structure as specified in claim 1, said straight end portions comprising both the top and bottom of the bar.

5. A structure as specified in claim 1, said bar or plate being humped or crowned at its top only, to provide said greater height at the middle of the bar.

6. A structure as specified in claim 1, said bar or plate being humped or crowned on its bottom only, whereby to provide said greater fishing height at the middle of the bar.

7. A structure as specified in claim 1, said bar or plate being humped or crowned on both the top and bottom thereof, thereby to provide said greater height for the middle of the bar.

8. A structure as specified in claim 1, said bar or plate being an old bar reshaped or reformed in the desired manner, of increased fishing height throughout its length as compared with the original bar.

Specification signed this 29th day of June, 1929.

LAWRENCE S. WILBUR.